(12) United States Patent
Fu et al.

(10) Patent No.: US 8,577,717 B2
(45) Date of Patent: Nov. 5, 2013

(54) METHOD AND SYSTEM FOR PREDICTING SHRINKABLE YIELD FOR BUSINESS ASSESSMENT OF INTEGRATED CIRCUIT DESIGN SHRINK

(75) Inventors: Chung-Min Fu, Taoyuan County (TW); Yu-Chyi Harn, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 1016 days.

(21) Appl. No.: 11/486,521

(22) Filed: Jul. 13, 2006

(65) Prior Publication Data
US 2007/0276770 A1 Nov. 29, 2007

Related U.S. Application Data

(60) Provisional application No. 60/808,307, filed on May 25, 2006.

(51) Int. Cl.
*G06Q 99/00* (2006.01)
*G06Q 30/02* (2012.01)
*G06Q 10/04* (2012.01)

(52) U.S. Cl.
CPC .......... *G06Q 30/0283* (2013.01); *G06Q 10/04* (2013.01)
USPC .......... 705/7.35; 705/1.1; 705/7.37; 705/400; 716/52; 703/14

(58) Field of Classification Search
CPC ..................... G06Q 10/06; G06Q 10/0639
USPC ............... 705/1, 400, 1.1, 7.37, 7.38, 11, 35; 703/2, 7, 14; 700/121; 382/144, 145, 382/149; 706/136
See application file for complete search history.

(56) References Cited

U.S. PATENT DOCUMENTS

| | | | |
|---|---|---|---|
| RE36,602 E * | 3/2000 | Sebastian et al. | 700/97 |
| 6,066,179 A | 5/2000 | Allan | |
| 6,470,229 B1 * | 10/2002 | Wang et al. | 700/121 |
| 6,658,375 B1 * | 12/2003 | Jones et al. | 703/2 |
| 6,868,301 B1 * | 3/2005 | Preil | 700/121 |
| 6,996,790 B2 * | 2/2006 | Chang | 716/4 |
| 7,013,441 B2 * | 3/2006 | Bickford et al. | 716/52 |
| 7,231,374 B1 * | 6/2007 | Balasinski | 705/400 |

(Continued)

FOREIGN PATENT DOCUMENTS

TW 466703 12/2001

OTHER PUBLICATIONS

Kuo et al. "An Overview of Manufacturing Yield and Reliability Modeling for Semiconductor Products", Mar. 1, 1999, IEEE, 16 pgs., (herein referred to as Kuo et al.).*

(Continued)

*Primary Examiner* — John Hayes
*Assistant Examiner* — Freda A Nelson
(74) *Attorney, Agent, or Firm* — Haynes and Boone, LLP

(57) ABSTRACT

A method and a system for predicting shrinkable yield for business assessment of integrated circuit design shrink are provided. An assessment system is provided to determine cost benefits of a design shrink of an integrated circuit chip. A cost benefit analysis across different design shrink technologies is provided early in the process, so that business decisions regarding employment of design shrinks can be made as early as possible.

11 Claims, 7 Drawing Sheets

(56) References Cited

U.S. PATENT DOCUMENTS

| | | | |
|---|---|---|---|
| 7,308,669 B2 * | 12/2007 | Buehler et al. | 716/13 |
| 7,337,149 B2 * | 2/2008 | Blouin et al. | 705/400 |
| 7,441,211 B1 * | 10/2008 | Gupta et al. | 716/133 |
| 2004/0078310 A1 * | 4/2004 | Shaffer | 705/35 |
| 2004/0153979 A1 | 8/2004 | Chang | |
| 2004/0181761 A1 * | 9/2004 | Kidera | 716/2 |
| 2005/0049911 A1 * | 3/2005 | Engelking et al. | 705/11 |
| 2005/0071788 A1 * | 3/2005 | Bickford et al. | 716/4 |
| 2005/0197816 A1 * | 9/2005 | Inukai et al. | 703/14 |
| 2005/0204327 A1 * | 9/2005 | Mukai et al. | 716/19 |
| 2006/0273242 A1 * | 12/2006 | Hunsche et al. | 250/208.1 |
| 2008/0281566 A1 * | 11/2008 | Wang et al. | 703/7 |

OTHER PUBLICATIONS

Gibson et al., "Statistically Based Parametric Yield Prediction for Integrated Circuits", Nov. 1997, IEEE Transactions on Semiconductor Manufacturing, vol. 10, No. 4, pp. 445-458 (14 pgs).*

Tegethoff et al., Defects, Fault Coverage, Yield and Cost, In Board Manufacturing, 1994 International Test Conference, 9 pgs.*

Gilg, Larry, "Known Good Die", 1997, Journal of Electronic Testing: Theory and Applications 8, pp. 15-25 (11 pgs).*

Gold et al., "A Quantitative Approach to Nonlinear Process Design Rule Scaling", 1999, Proceedings of the 20th Anniversary Conference on Advanced Research in VLSI, 14 Pgs.*

McDonald, Chris; "New tools for yield improvement in integrated circuit manufacturing: can they be applied reliability?", 1999, Microelectronics Reliability, pp. 731-739, 9 pgs.*

Heineken et al.; "Performance-Manufacturability Tradeoffs in IC Design", Feb. 22-26, 1998; Design, Automation and Test in Europe, 1998 Proceedings, pp. 563-567 (1-5).*

Seidel, Phil, Lithography EUV Source Cost of Ownership Panel SEMATECH Perspective, Feb. 27, 2005, EUV Source Workshop, pp. 1-24.*

"Cost Effective IC Manufacturing", 1998-1998, Integrated Circuit Engineering Corporation, Chapter 7, Changing Wafer Size and the Move to 300mm, pp. 7-1 to 7-16, (17 pages).*

Laura, "Cost Effective IC Manufacturing", 1998-1998, Integrated Circuit Engineering Corporation, Chapter 2, Costs Per Wafer, pp. 2-1 to 7-16, (17 pages).*

ASIC Outlook 1998, Integrated Circuit Engineering Corporation, Chapter 5, Asic Cost Effectiveness, pp. 5-1 to 5-38, (38 pages).*

Heineken et al.; "Performance-Manufacturability Tradeoffs in IC Design", Feb. 22-26, 1998; Design, Automation and Test in Europe, 1998, Proceedings, pp. 563-567 (1-5).*

Balasinski, "Optimizing the Cost of Design Rule Modifications for Subsequent Generations of Semiconductor Technology", 2000, IEEE/SEMI advanced Semiconductor Manufacturing Conference, pp. 256-262.*

Kuo et al. "An Overview of Manufacturing Yield and Reliability Modeling for Semiconductor Products", Mar. 1, 1999, I EEE, 16 pgs.*

Taiwanese Patent Office, Office Action dated Oct. 11, 2010, Application No. 096115565, 7 pages.

* cited by examiner

US 8,577,717 B2

METHOD AND SYSTEM FOR PREDICTING SHRINKABLE YIELD FOR BUSINESS ASSESSMENT OF INTEGRATED CIRCUIT DESIGN SHRINK

BACKGROUND

In a semiconductor manufacturing process, integrated circuit chip designers may shrink the design of an IC chip directly. For example, the design of an IC chip may be shrunk from 0.18 μm to 0.16 μm, on the same size of a wafer in a foundry. Some times the design shrink may only apply to part of the process, such as the back-end of a particular process technology. Often as a result of a design shrink, more IC chips can be produced from a single wafer, chip speed or power consumption is improved, and/or other benefits are obtained.

However, the overall cost reduction associated with a design-shrink is not directly evident from the die-area reduction. In particular, the process flow for the prior design may have a better yield percentage. Also, the design-shrink itself may cause problems that need to be resolved—adding to the overall cost. The time it takes for a design shrink to become profitable, referred to as "the interaction time," may take anywhere from a quarter to a number of years. The interaction time includes the time it takes to develop foundry technologies, silicon-proven learning, and the like. This time-consuming process might make it difficult to realize real benefits, especially with ever-changing business situations.

Determination of the interaction time and chip-area reduction has neither been reliable nor systematic. Thus, an early assessment method on IC design is desired. A valid assessment approach would be beneficial for layout quality index, intelligent property (IP) design, design shrink, and business decision for product cost evaluation.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
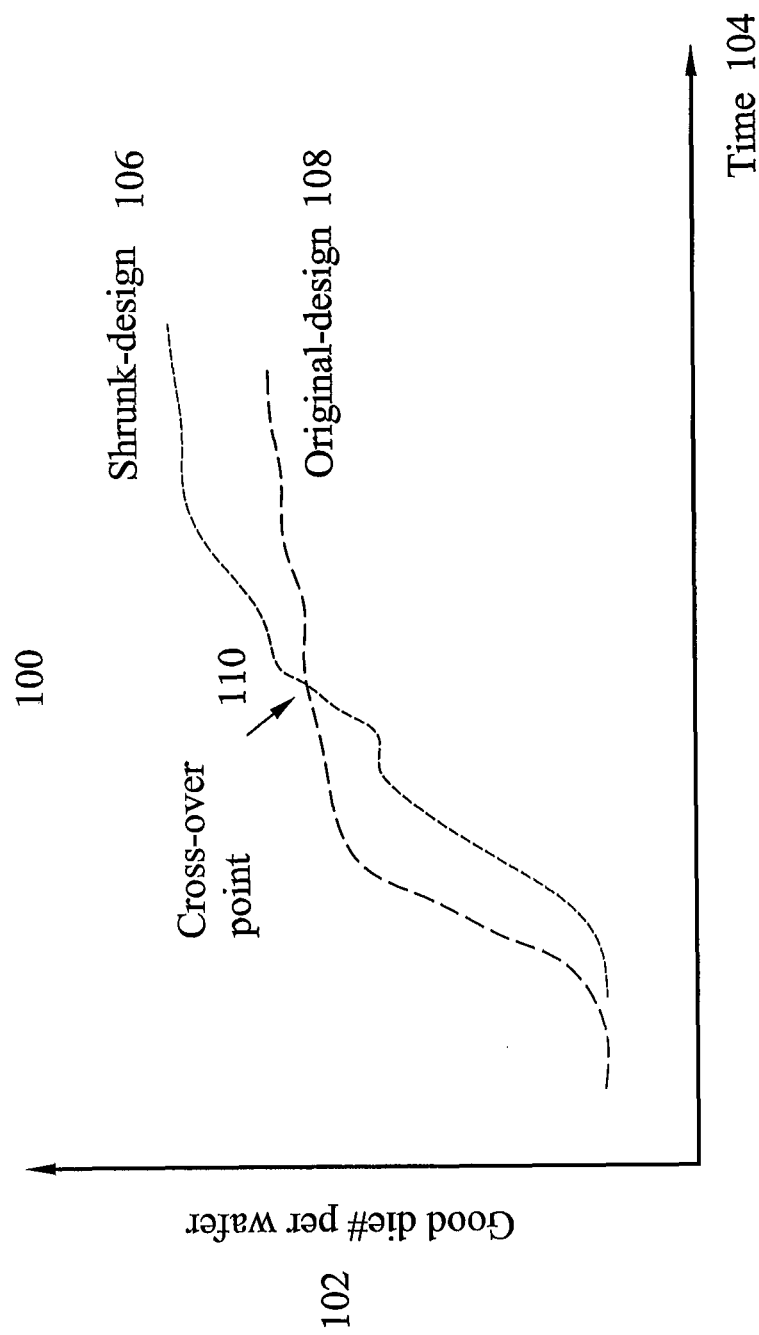
FIG. 1 is a normal manufacturing ramping scenario from a given design and its shrunk design is depicted.

It's a common idea to achieve the IC cost-down need by directly or partially shrinking an original design as a shrunk design. Turning now to FIG. 1, a normal manufacturing ramping scenario from a given design and its shrunk design is depicted. The Y-axis 102 of graph 100 indicates a number of good die per wafer produced at each time period. The X-axis 104 of graph 100 indicates an amount of time the given design is employed. In this example, an original design 108 initially has a better yield in the beginning. Once a cross-over point 110 is reached, the shrunk design 106 gives more good dies from a wafer than the original design 108. Based on these results, the cost-down estimation and business decisions can be made to employ shrunk design 106 on the chip.

Figure 2:
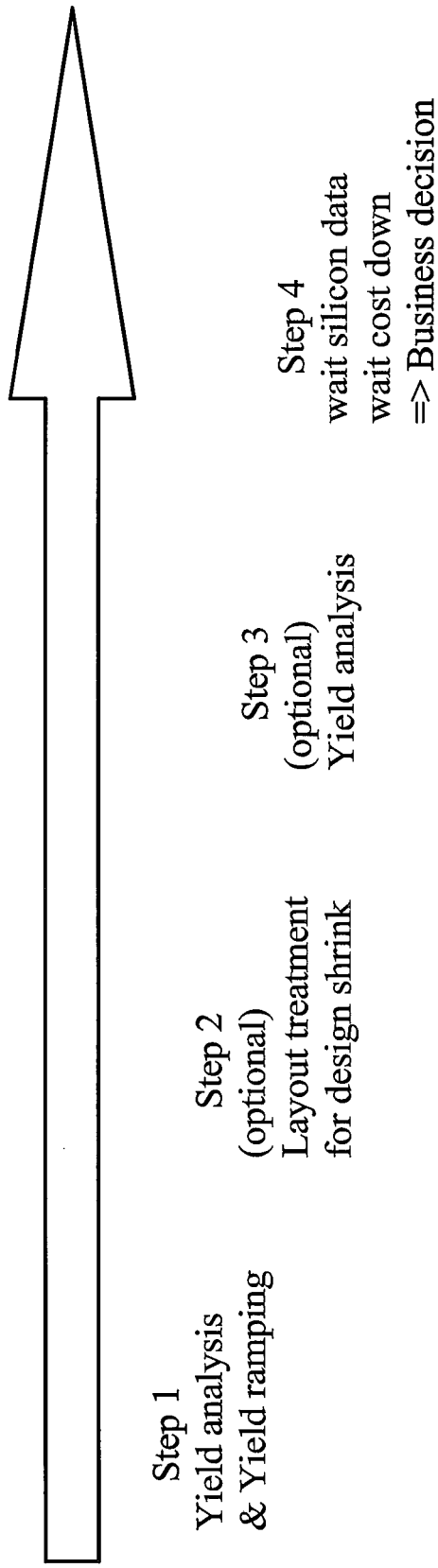
FIG. 2 is a diagram illustrating a technology migration evolution for performing design shrink yield analysis.

Moreover, it is important to evaluate the shrunk design and original design as early in the process as possible so that early cost assessments can be achieved. Turning now to FIG. 2, a diagram illustrating a technology migration evolution for performing design-shrink yield analysis is depicted. During the evolution of technology migration, four major steps are performed. Step 1 is yield analysis and yield ramping 200. In this step, an original design layout database, which stores original designs of the chip, is used to simulate original yield results of the wafer. The simulation is performed by a yield simulator.

Yield simulator is a tool that is used to predict the yield of a chip based on its layout. Yield simulator takes the original design of the chip and other process parameters as inputs and generates original yield results using a certain simulation method. The simulation method can generate the modeling yield results based on the layout of the chip from the given design layout database. The simulation method can generate the modeling yield based on a number of alternatives, such as the numerical calculation, polygons operations, dot-throwing operations and the like.

The second step of the evolution is layout treatment for design shrink 210. This step involves realizing the shrink design layout on the chip. After the layout is realized, the third step of the evolution, yield analysis 212, is performed. In this step, a shrunk design layout database, which stores shrunk design layouts of the chip, is used to simulate yield results of the wafer. Similar to step 1, the simulation is performed by the yield simulator (or another yield simulator). Yield simulator takes the shrunk design of the chip and other process parameters as inputs and generates shrunk yield results using the simulation algorithm.

It is noted that step 2 and step 3 are optional, which means that, in the current evolution, the layout treatment for design shrink and the yield analysis may or may not be performed. At the end of the evolution, which may occur after a long period of time, silicon data and cost down benefits are finally realized and business decisions can be made as to whether design shrink should be employed 218. While cost down benefits may finally be realized, this process is time consuming.

Aspects of the present invention provide a computer-implemented method, a computer system, and a computer program product for predicting shrinkable yield for business assessment of integrated circuit design shrink. Instead of having to wait for a long period of time before cost down benefits of the direct design-shrink are realized, the aspects of the present invention provide a method for predicting the yield of the wafer if the shrunk design is employed early in the process. In this way, business decisions can be made early to cut down costs.

Figure 3:
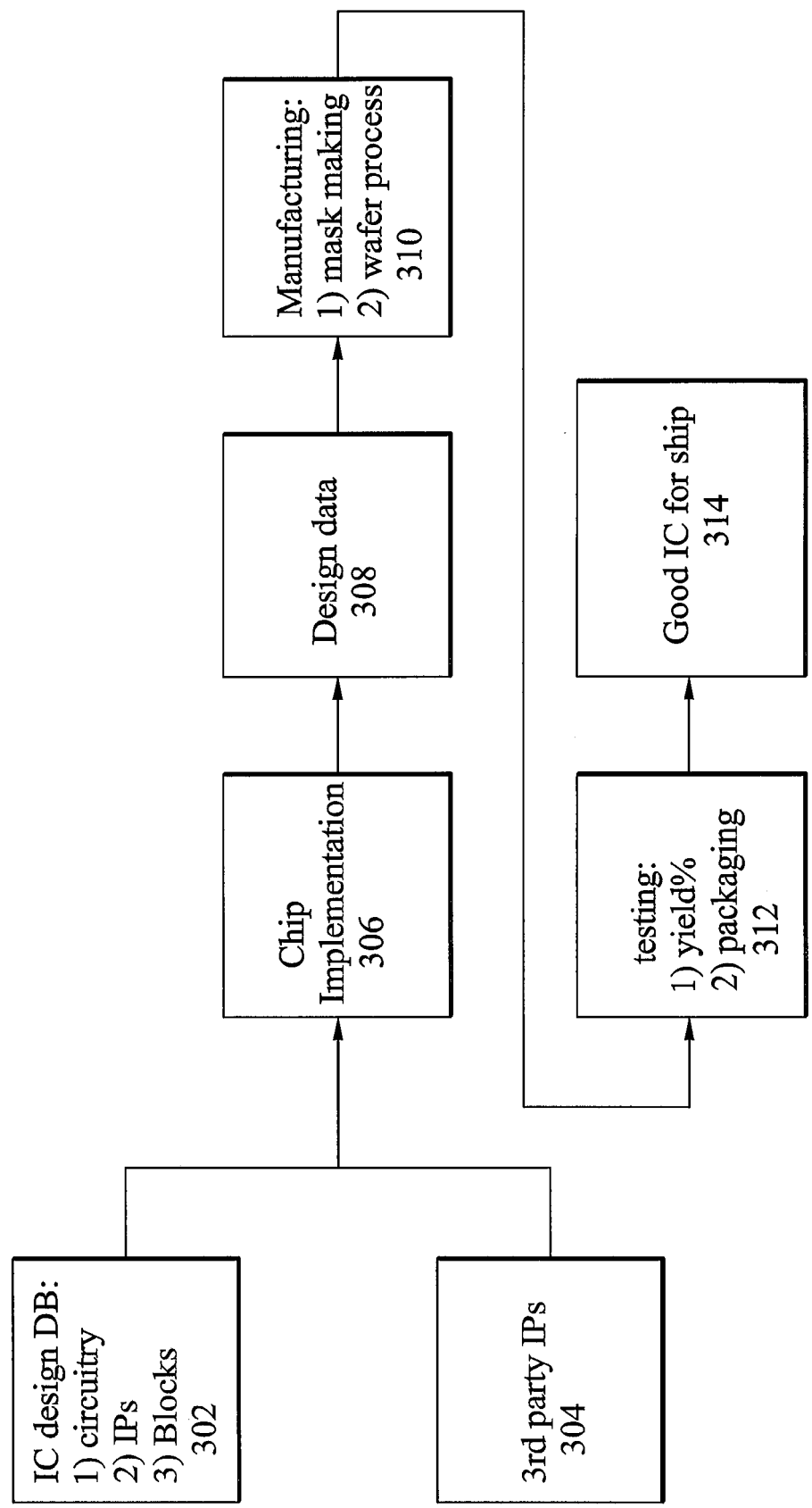
FIG. 3. is a diagram illustrating an exemplary integrated circuit design to silicon flow in which (shrinkable) yield prediction may be performed.

Turning now to FIG. 3, a diagram illustrating an exemplary integrated circuit design to silicon flow in which shrinkable yield prediction may be performed is depicted. As shown in FIG. 3, generally, an integrated circuit design database 302 and third party IPs 304 are used for chip implementation 306. IC design database 302 may comprise circuitry design, IPs and block designs. Chip implementation 306 generates design data 308 after implementing the design in the integrated circuit. Based on the design data 308, manufacturing 310 of the integrated circuit is performed. Examples of manufacturing steps performed are mask making and wafer processing.

Once the integrated circuit is manufactured, testing 312 of the integrated circuit is performed. Testing 312 of the integrated circuit may include yield percentage testing and packaging testing. Once testing 312 is complete, good integrated circuits that are ready for ship 314 are identified. The shrinkable yield predication of the present invention may be performed in various steps of this integrated circuit design to silicon flow. For example, the shrinkable yield prediction may be performed based on intelligent property (IP) or block design database 302, third party IP evaluations 304, design data 308 generation. Intelligent property design is a design of the integrated chip in different format, for example, in layout format. By performing shrinkable yield prediction based on a given design, a design-for-manufacturing (DFM) awareness design may be implemented early in the process by performing design shrink evaluation at each yield prediction step.

Figure 4:
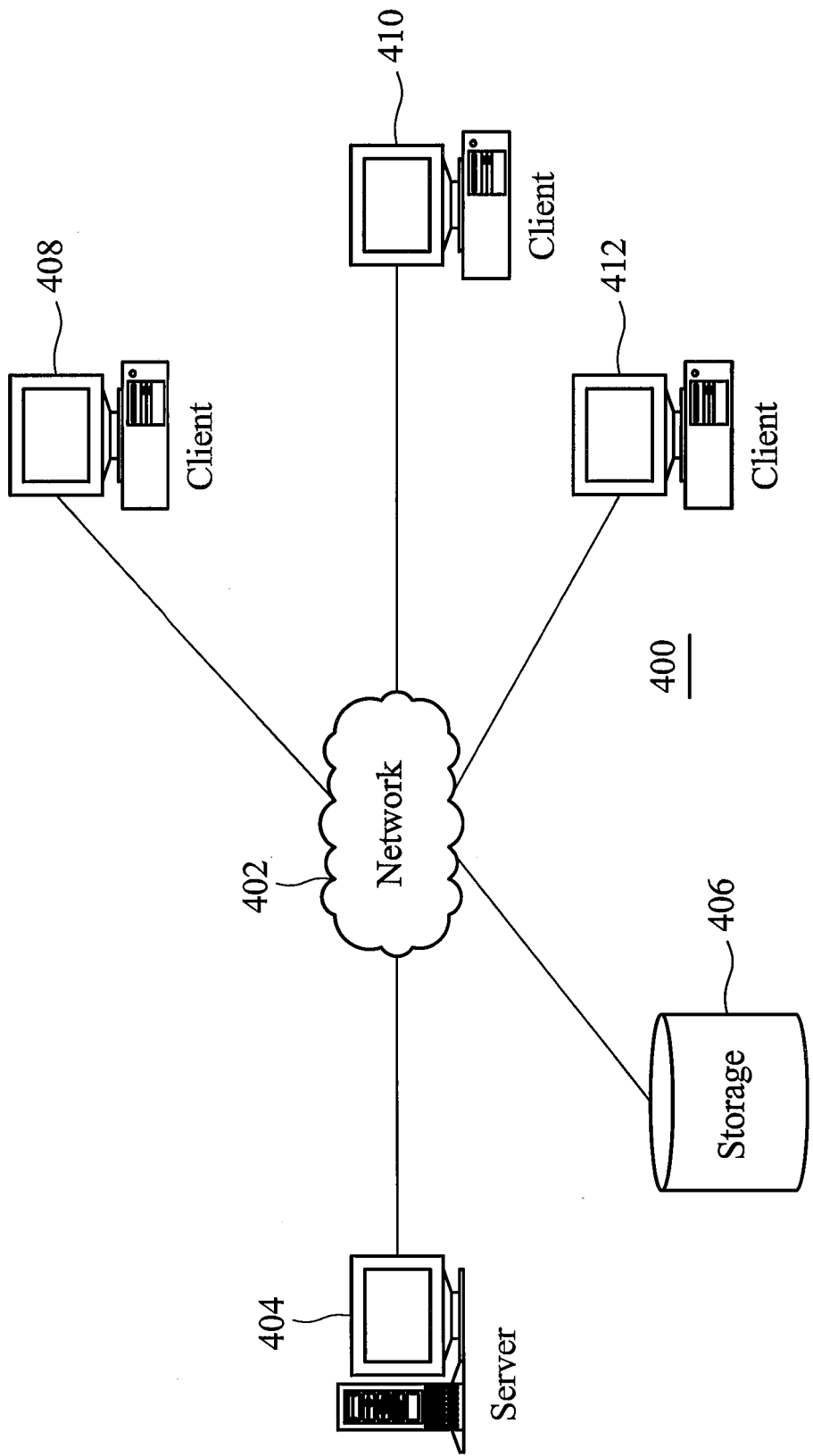
FIG. 4 is a pictorial representation of a network of data processing systems in which the present invention may be implemented.

Turning now to FIG. 4, a data processing system 400 includes a network 402, which is the medium used to provide communications links between various devices and computers connected together within the data processing system 400. Network 402 may include connections such as wire, wireless, or fiber optic cables.

In the depicted example, a server 404 is connected to the network 402 along with a storage unit 406. In addition, clients 408, 410, and 412 are connected to the network 402. These clients 408, 410, and 412 may be, for example, personal computers or network computers. In the depicted example, the server 404 provides data, such as boot files, operating system images, and applications to the clients 408-412. Clients 408, 410, and 412 are clients to the server 404. Network data processing system 400 may include additional servers, clients, and other devices not shown.

In the depicted example, the network 402 may include the Internet and/or a collection of networks and gateways that use such things as a Transmission Control Protocol/Internet Protocol (TCP/IP) suite of protocols to communicate with one another. In another example, the network 402 may include a number of different types of networks, such as a local area network (LAN), or a wide area network (WAN). FIG. 4 is intended as an example, and not as an architectural limitation for the present invention.

Figure 5:
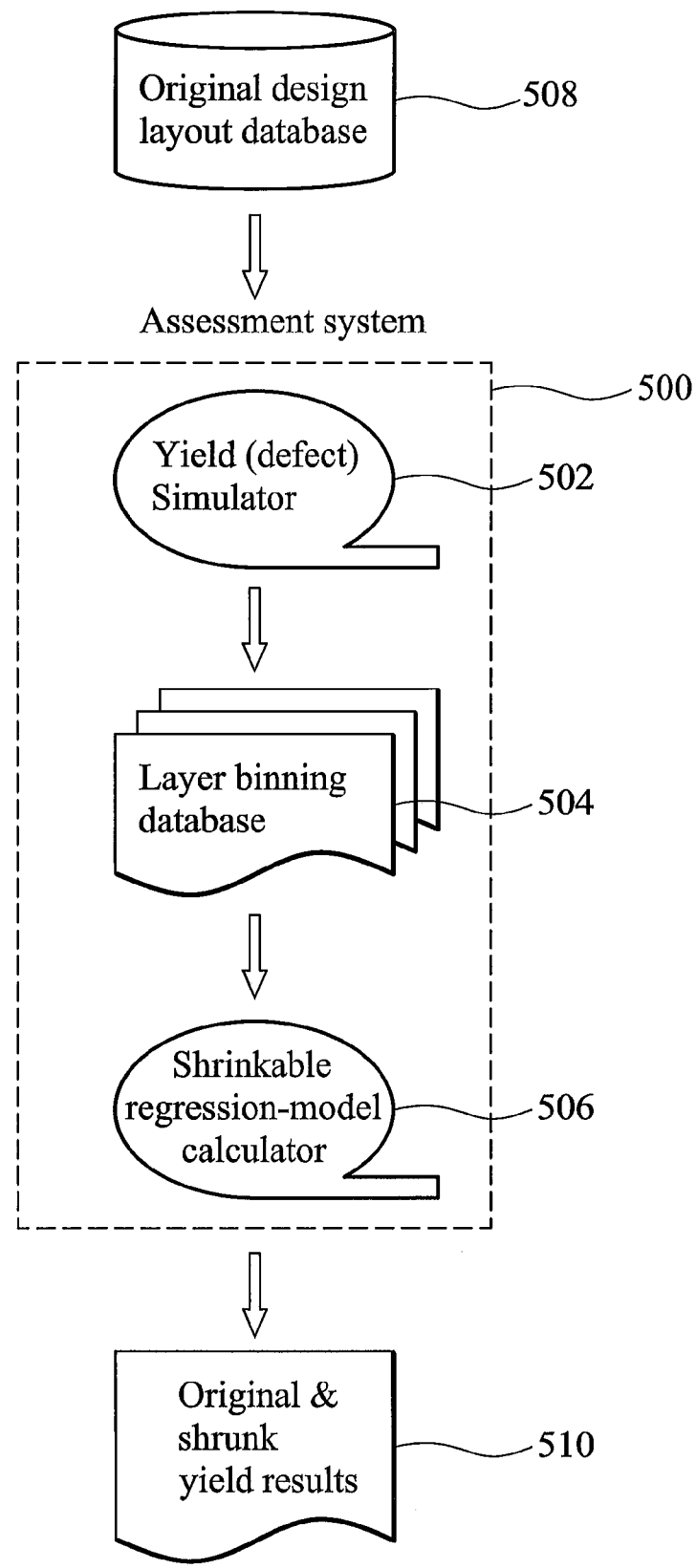
FIG. 5 is a process flowchart illustrating a business assessment system for facilitating business decisions of integrated circuit design-shrink.

Turning now to FIG. 5, a process flowchart illustrates one embodiment of a business assessment system for facilitating business decisions of integrated circuit design-shrink. The business assessment system includes an assessment system 500, which may be implemented as a software program executing within a client, such as clients 408, 410, and 412, or on a server, such as server 404, in FIG. 4.

In an illustrative embodiment, the assessment system 500 includes three components: a yield simulator 502, a database 504 of design layers information, shrink tables, and algorithms, and a shrinkable regression-model calculator 506. Yield simulator 502 of the assessment system 500 is similar to the yield simulator 204 in FIG. 2, which takes the original design layouts from the original design database 508 for yield simulation. Once the original layouts are analyzed with the given program or method, the results are populated into the database 504. The database 504 may be implemented within a storage unit, such as storage 406 in FIG. 4.

In the present embodiment, multiple shrink tables and algorithms are present within the database 504. A shrink table includes information and rules by binnings, layers, IP blocks, and the like. Each bin collects data for a defined design shrink, for example, from 0.13 µm to 0.11 µm technology. More details regarding binnings are discussed in FIG. 6. Once the results are populated into the database 504, a shrinkable regression-model calculator 506 is used to calculate original and shrunk yield results 510. In some embodiments, the shrinkable calculator 506 takes into account manufacturing information, which include process parameters and tech shrink rules, when calculating the results. By updating the manufacturing parameters information from time to time, prediction results can be as close as possible to the actual silicon results.

Once the original and shrunk yield results 510 are analyzed, the cost saving benefit and the business decisions can be made by evaluating the difference between the shrunk design and the original design. Examples of business decisions that can be made based on the original and shrunk yield results 510 include the possibility to delay or accelerate the time when the shrinking is to be done, design optimization, concurrent projects, revising future research and development roadmaps, and push process shrinking capability. Design optimization includes redesigning the layout of the chip.

Figure 6:
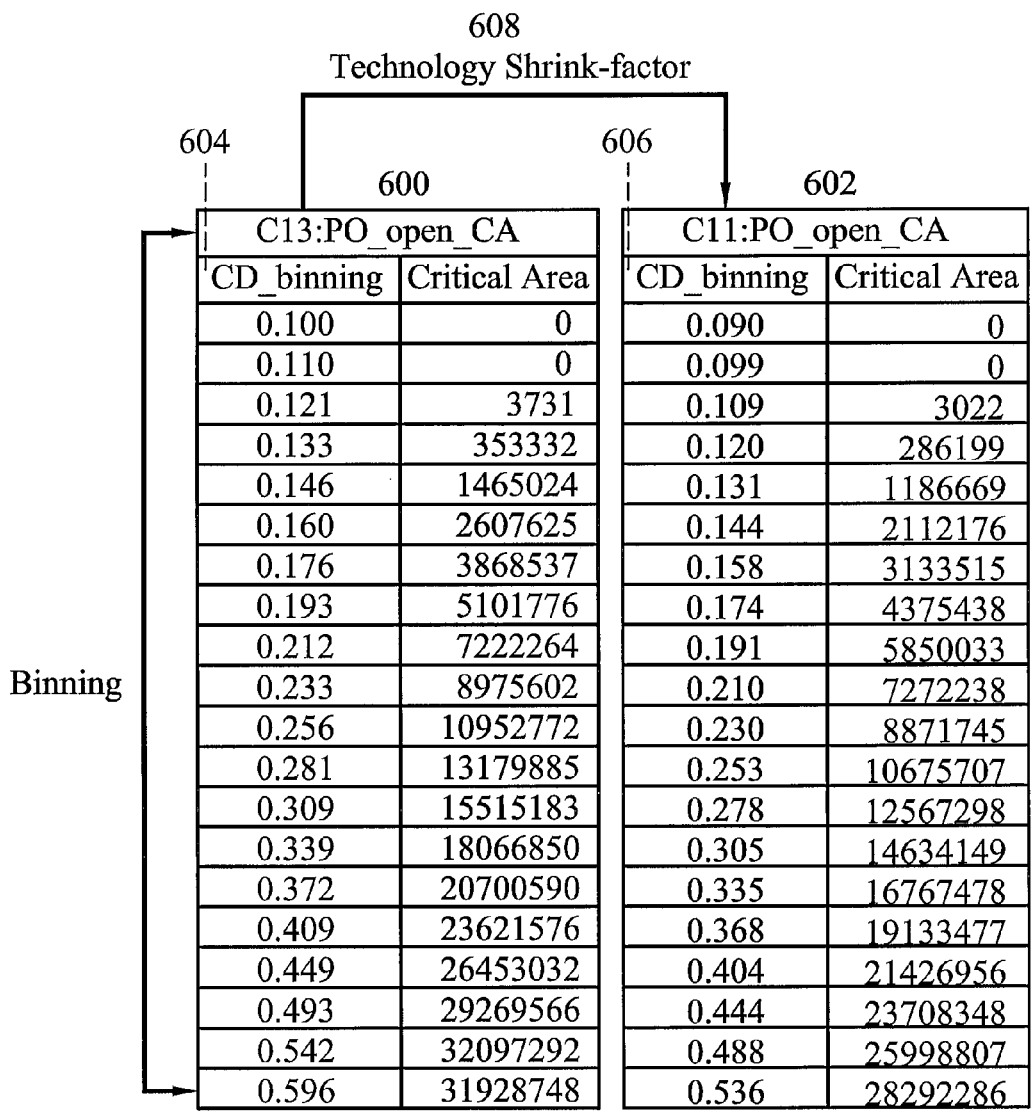
FIG. 6 is a diagram illustrating exemplary binnings for critical area analysis and technology shrink factor.

Turning now to FIG. 6, a diagram illustrating exemplary binnings for critical area analysis and technology shrink factor is depicted. As shown in FIG. 6, two shrink tables 600 and 602 are shown. Yield simulator, such as yield simulator 502 in FIG. 5, generates critical dimension binnings 604 of different design shrinks and corresponding critical area 606 for each shrink table. Examples of critical dimension binnings include 0.100, 0.110, and 0.121. These CD binnings 604 and corresponding critical area 606 are generated by the yield simulator using the original layout design database. In addition to binnings, other process parameters or rules, such as layers, blocks, may be generated by yield simulator without departing the spirit and scope of the present invention.

Also shown in FIG. 6 is technology shrink factor 608. An example of a technology shrink factor is from 0.100 to 0.090. Shrinkable regression-model calculator, such as shrinkable calculator 506 in FIG. 5, may use the technology shrink-factor 608 to perform shrunk yield analysis. More details regarding the shrinkable regression-model calculator is discussed in FIG. 7.

Figure 7:
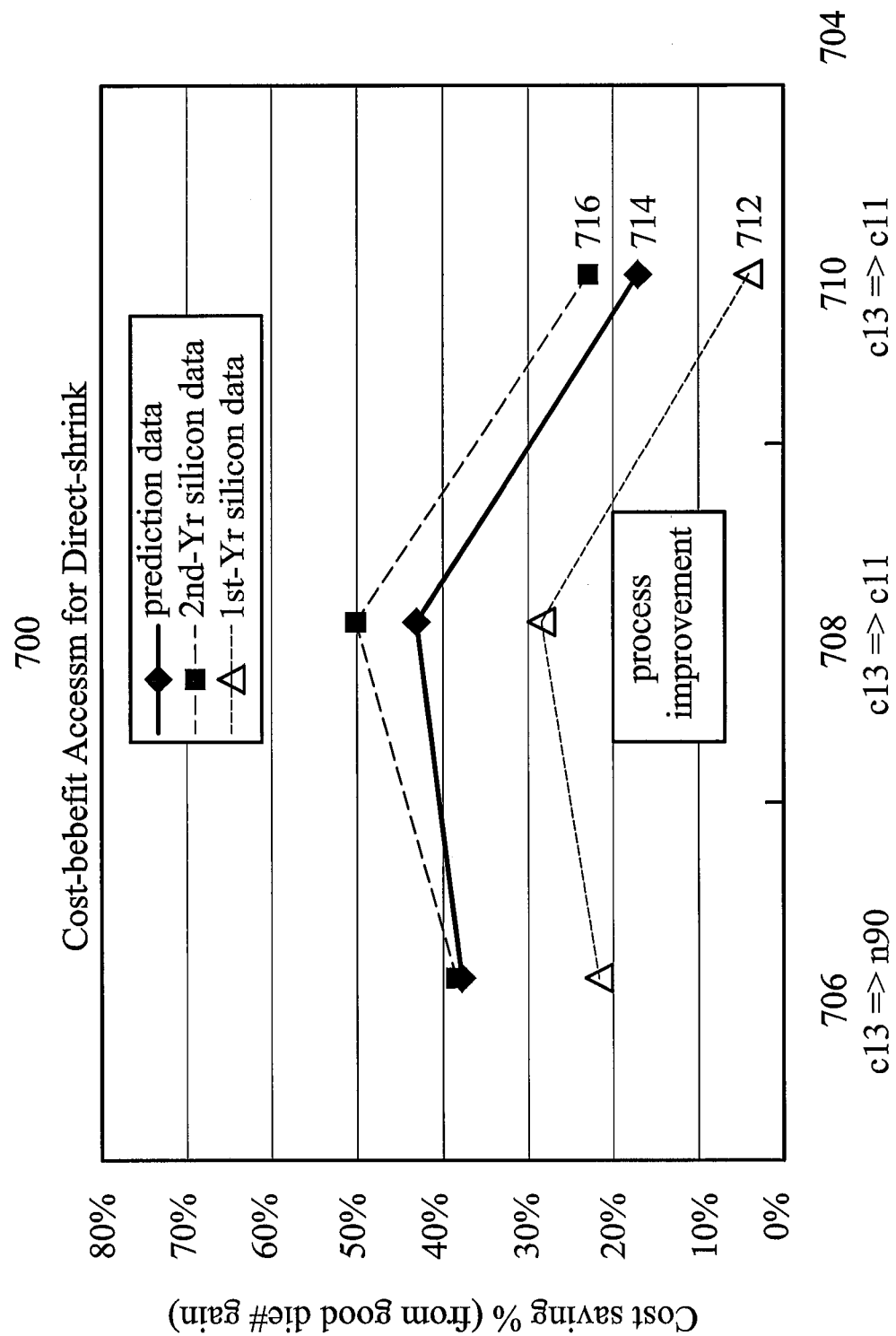
FIG. 7 is a diagram illustrating an exemplary cost benefit assessment for direct shrink generated by the assessment system.

Turning now to FIG. 7, a graph 700 illustrates an exemplary cost benefit assessment for direct shrink generated by the assessment system 500 (FIG. 5) is depicted. The Y-axis 702 of the graph 700 indicates the percentage of cost savings for a given design-shrink. The percentage is based on the number of good die produced per wafer. The X-axis 704 of the graph 700 indicates three types of chips with a design shrink from 0.13 µm to 90 nm 706, from 0.13 µm to 0.11 µm 708, and another from 0.13 µm to 0.11 µm 710. Line 712 represents first year silicon data across all three types of chips. Line 714 represents prediction data that is generated by the assessment system 500 across all three types of chips. Line 716 represents the second year silicon data across all three types of chips.

As shown in graph 700, all three silicon yields continuously improve. Prediction data 714 generated by the assessment system closely matches the second year silicon data 716 cost savings. This means that the prediction data 714 generated by the assessment system provides a close prediction of cost savings that will result after two years of silicon learning process. Thus, more accurate prediction of silicon yields may be realized early on instead of having to wait maybe two years for the actual silicon data.

In summary, the aspects of the present invention provide a creative assessment system to determine cost benefits of design shrink. Instead of a time-consuming silicon learning process or a traditional guessing from chip area, the assessment system provides cost benefit analysis across different design shrink technologies early in the process, such that business decisions regarding employment of design shrink can be made as early as possible.

The present invention can take the form of an entirely hardware embodiment, an entirely software embodiment, or an embodiment containing both hardware and software elements. In an illustrative embodiment, the invention is implemented in software, which includes but is not limited to firmware, resident software, microcode, etc.

Furthermore, the invention can take the form of a computer program product accessible from a tangible computer-usable or computer-readable medium providing program code for use by or in connection with a computer or any instruction execution system. For the purposes of this description, a tangible computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, a semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital video disc (DVD).

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method for predicting cost benefits of an integrated circuit chip design shrink, the method comprising:
    calculating, by a business assessment computer, an original yield result based on a design layout of the integrated circuit chip using a yield simulator executed on the business assessment computer;
    populating original layout information into a database in computer readable storage, the database comprising information of different shrink rules of the integrated circuit chip for a plurality of design shrinks, each design shrink generated by an application of a different technology shrink factor to the design layout, each different technology shrink factor being defined from a first dimension to a second dimension, the different shrink rules being organized in a plurality of shrink tables each having a plurality of critical area values corresponding to different critical dimension bins, wherein the plurality of shrink tables includes a first shrink table associated with the design layout and a plurality of second shrink tables each associated with a respective one of the plurality of design shrinks;
    calculating, by the business assessment computer, a plurality of shrunk yield results for the plurality of design shrinks based on the design layout, the different shrink rules, and a process parameter using a shrinkable regression-model calculator executed on the business assessment computer; and
    determining, by the business assessment computer, a cost benefit across the plurality of design shrinks based on the original yield result and the shrunk yield results, wherein the cost benefit includes a predicted cost savings over a defined time period.

2. The method of claim 1, wherein the shrinkable regression-model calculator calculates a shrunk yield result based on manufacturing information of the integrated circuit chip.

3. The method of claim 1, wherein the original yield result and the shrunk yield results indicate the predicted cost savings based on a number of good die produced per wafer using an original layout of the integrated circuit chip.

4. The method of claim 3, wherein a difference between the shrunk yield results and actual silicon results is minimized.

5. The method of claim 1, further comprising fabricating a further integrated circuit chip having a shrink design based on the determined cost benefit.

6. A business assessment system for integrated circuit chip design shrink, the system comprising:
    a yield simulator configured to generate an original yield result based on a design layout of the integrated circuit chip;
    a database in computer readable storage comprising information of original layout information and different shrink rules of the integrated circuit chip for a plurality of design shrinks, each design shrink generated by an application of a different technology shrink factor to the design layout, each different technology shrink factor being defined from a first dimension to a second dimension, the different shrink rules being organized in a plurality of shrink tables each having a plurality of critical area values corresponding to different critical dimension bins, wherein the plurality of shrink tables includes a first shrink table associated with the design layout and a plurality of second shrink tables each associated with a respective one of the plurality of design shrinks;
    a shrinkable regression-model calculator configured to generate a plurality of shrunk yield results for the plurality of design shrinks based on the design layout, the different shrink rules, and a process parameter; and
    a business assessment computer configured to assess a cost benefit across the plurality of design shrinks based on the original yield result and the shrunk yield results, wherein the cost benefit includes a predicted cost savings over a defined time period.

7. The business assessment system of claim 6, wherein the shrinkable regression-model calculator calculates the shrunk yield results based on manufacturing information of the integrated circuit chip.

8. The business assessment system of claim 7, wherein a difference between the shrunk yield results and actual silicon results is minimized.

9. The business assessment system of claim 6, wherein the business assessment computer assesses the original yield results and the shrunk yield results in an early stage of a design-to-silicon flow.

10. The business assessment system of claim 6, wherein the original yield result and the shrunk yield results are generated using a given original layout, a shrink factor approach based on cross technology shrink rules and process parameters, and process information from a manufacturer.

11. The business assessment system of claim 6, wherein the original yield result and the shrunk yield results are generated using one of a given IP design, a design macro/block, and a full chip design of the integrated circuit chip.

* * * * *